(12) United States Patent
Choi et al.

(10) Patent No.: US 12,224,128 B2
(45) Date of Patent: Feb. 11, 2025

(54) MULTILAYER ELECTRONIC COMPONENT

(71) Applicant: SAMSUNG ELECTRO-MECHANICS CO., LTD., Suwon-si (KR)

(72) Inventors: Hyo Sung Choi, Suwon-si (KR); Jung Jin Park, Suwon-si (KR); Ho Sam Choi, Suwon-si (KR); Jae Won Kim, Suwon-si (KR); Sun Mi Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 140 days.

(21) Appl. No.: 18/139,444

(22) Filed: Apr. 26, 2023

(65) Prior Publication Data

US 2024/0234034 A1     Jul. 11, 2024

(30) Foreign Application Priority Data

Dec. 29, 2022  (KR) .................. 10-2022-0188486

(51) Int. Cl.
*H01G 4/30* (2006.01)
*C04B 35/64* (2006.01)
(Continued)

(52) U.S. Cl.
CPC .............. *H01G 4/30* (2013.01); *C04B 35/64* (2013.01); *H01G 4/008* (2013.01); *H01G 4/012* (2013.01); *H01G 4/1227* (2013.01); *H01G 4/224* (2013.01)

(58) Field of Classification Search
CPC ........ C04B 35/64; H01G 4/008; H01G 4/012; H01G 4/1227; H01G 4/224; H01G 4/30
See application file for complete search history.

(56) References Cited

U.S. PATENT DOCUMENTS

| | | | | |
|---|---|---|---|---|
| 4,612,600 A | * | 9/1986 | Hodgkins | ............. C04B 35/465 29/25.42 |
| 2012/0262840 A1 | * | 10/2012 | Koizumi | .................. H01G 4/12 361/321.2 |

(Continued)

FOREIGN PATENT DOCUMENTS

| | | |
|---|---|---|
| CN | 104496464 A | 4/2015 |
| EP | 0 183 366 A2 | 6/1986 |

(Continued)

OTHER PUBLICATIONS

Search Report dated Nov. 3, 2023 issued in corresponding European Patent Application No. 23171340.5.

*Primary Examiner* — Nathan Milakovich
(74) *Attorney, Agent, or Firm* — Morgan, Lewis & Bockius LLP

(57) ABSTRACT

A multilayer electronic component includes a body including a capacitance formation portion including a dielectric layer and an internal electrode, alternately disposed in a first direction, and a cover portion disposed on both end surfaces of the capacitance formation portion opposing each other in the first direction; and an external electrode disposed outside the body and connected to the internal electrode, wherein the cover portion contains fluorine (F), and A1 and A2 satisfy A2>A1, where A1 is an average size of a dielectric grain included in the cover portion, and A2 is an average size of a dielectric grain included in the dielectric layer.

19 Claims, 10 Drawing Sheets

(51) Int. Cl.
*H01G 4/008* (2006.01)
*H01G 4/012* (2006.01)
*H01G 4/12* (2006.01)
*H01G 4/224* (2006.01)

(56) References Cited

U.S. PATENT DOCUMENTS

| | | | |
|---|---|---|---|
| 2016/0172110 A1* | 6/2016 | Otani | H10N 30/063 |
| | | | 361/301.4 |
| 2017/0011851 A1* | 1/2017 | Yoon | C04B 35/4684 |
| 2018/0240592 A1 | 8/2018 | Morita | |
| 2019/0198245 A1 | 6/2019 | Sanner et al. | |
| 2022/0199328 A1 | 6/2022 | Choi et al. | |
| 2022/0208455 A1* | 6/2022 | Nam | H01G 4/30 |
| 2024/0266114 A1* | 8/2024 | Choi | H01G 4/228 |

FOREIGN PATENT DOCUMENTS

| | | |
|---|---|---|
| JP | 2007-261941 A | 10/2007 |
| JP | 2018-137298 A | 8/2018 |
| KR | 10-2017-0127398 A | 11/2017 |
| KR | 10-2019-0055807 A | 5/2019 |

\* cited by examiner

MULTILAYER ELECTRONIC COMPONENT

CROSS-REFERENCE TO RELATED APPLICATION(S)

This application claims benefit of priority to Korean Patent Application No. 10-2022-0188486 filed on Dec. 29, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, is easily mounted, and may thus be used as a component of various electronic devices. There has been increasing demand for a multilayer ceramic capacitor to have a reduced size and higher capacitance as each of various electronic devices such as a computer, a mobile device, and the like have a reduced size and higher output.

A multilayer ceramic capacitor may generally include a capacitance formation portion in which a dielectric layer and an internal electrode are alternately disposed to form capacitance, and a cover portion for protecting the capacitance formation portion. The cover portion may be formed by printing ceramic slurry on a carrier film to form a cover portion pattern, peeling the cover portion pattern from the carrier film, and then stacking the cover portion pattern on the capacitance formation portion.

Meanwhile, there may be problems in that, when the cover portion pattern is peeled from the carrier film, static electricity may be generated due to friction and/or an energy level difference between materials, and such static electricity may generate folding and/or wrinkle defects in the cover portion pattern to cause a decrease in withstand voltage and a short circuit failure in the multilayer ceramic capacitor.

Meanwhile, in order to improve moisture resistance reliability of the multilayer ceramic capacitor by preventing cracks or the like due to impact as a use environment of the multilayer ceramic capacitor becomes harsh, it is desirable that a microstructure of the cover portion is precisely implemented and toughness of the cover portion increases.

Therefore, in order to prevent problems of causing folding and/or wrinkle defects of the cover portion pattern to cause a decrease in withstand voltage and a short circuit failure in the multilayer ceramic capacitor, it is important to add an antistatic agent to the cover portion pattern, but to properly select a substance capable of increasing density and toughness of the cover portions after sintering.

SUMMARY

An aspect of the present disclosure is to increase density and toughness of a cover portion, to improve moisture resistance reliability of a multilayer electronic component.

An aspect of the present disclosure is to prevent folding and wrinkle defects of a cover portion pattern, to prevent a decrease in withstand voltage and a short circuit failure of a multilayer electronic component.

However, objects of the present disclosure are not limited to the above, and will be more easily understood in the process of describing specific embodiments of the present disclosure.

According to an aspect of the present disclosure, a multilayer electronic component includes a body including a capacitance formation portion including a dielectric layer and an internal electrode, alternately disposed in a first direction, and a cover portion disposed on both end surfaces of the capacitance formation portion opposing each other in the first direction; and an external electrode disposed outside the body and connected to the internal electrode, wherein the cover portion includes fluorine (F), and A1 and A2 satisfy A2>A1, where A1 is an average size of a dielectric grain included in the cover portion, and A2 is an average size of a dielectric grain included in the dielectric layer.

According to another aspect of the present disclosure, a method for manufacturing a multilayer electronic component including a body including a capacitance formation portion including a dielectric layer and an internal electrode, alternately disposed in a first direction, and a cover portion disposed on both end surfaces of the capacitance formation portion opposing each other in the first direction, and an external electrode disposed outside the body and connected to the internal electrode, the method includes a printing process including a process of forming a cover portion pattern by printing a first ceramic slurry including a first dielectric material and a fluorine-based compound, and at least one of a process of forming a dielectric pattern by printing a second ceramic slurry including a second dielectric material, and a process of forming an internal electrode pattern by printing a conductive paste for the internal electrode including a conductive particle for the internal electrode; a stacking process of performing the printing process a plurality of times to obtain a stack body in which the cover portion pattern, the dielectric pattern, and the internal electrode pattern are stacked; a sintering process of sintering the stack body to obtain the body; and a process of forming the external electrode outside the body, wherein the first dielectric material includes $BaTiO_3$ as a main component, and an amount of a fluorine-based compound included in the first ceramic slurry is 0.2 to 1.0 parts by weight, relative to 100 parts by weight of $BaTiO_3$.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
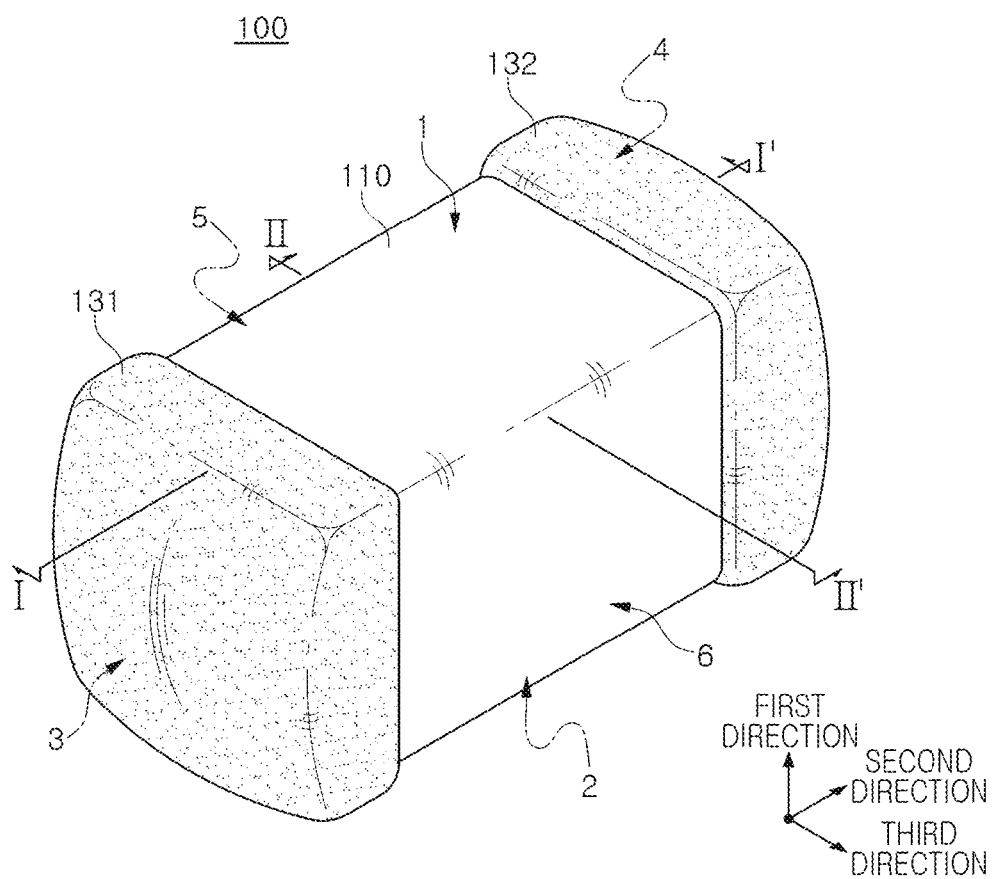
FIG. 1 is a perspective view schematically illustrating a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an embodiment of the present disclosure.

Figure 2:
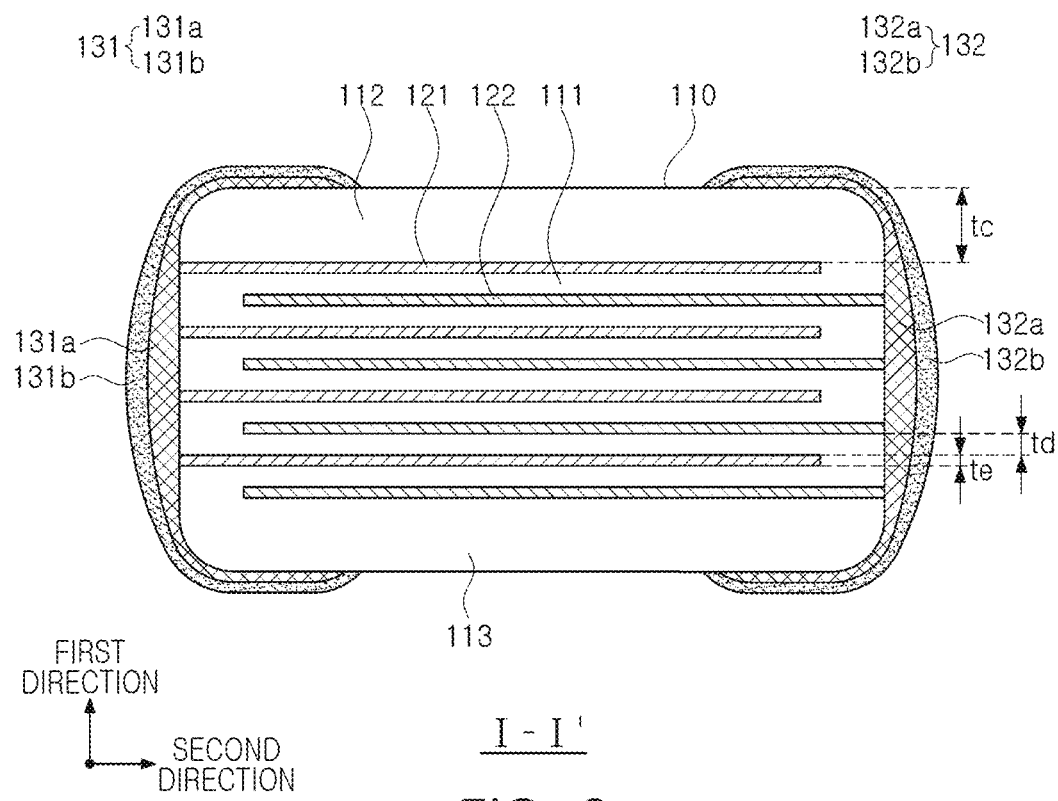
FIG. 2 is a cross-sectional view schematically illustrating the multilayer electronic component, taken along line I-I' as shown in FIG. 1.

FIG. 2 is a cross-sectional view schematically illustrating the multilayer electronic component, taken along line I-I' as shown in FIG. 1.

Figure 3:
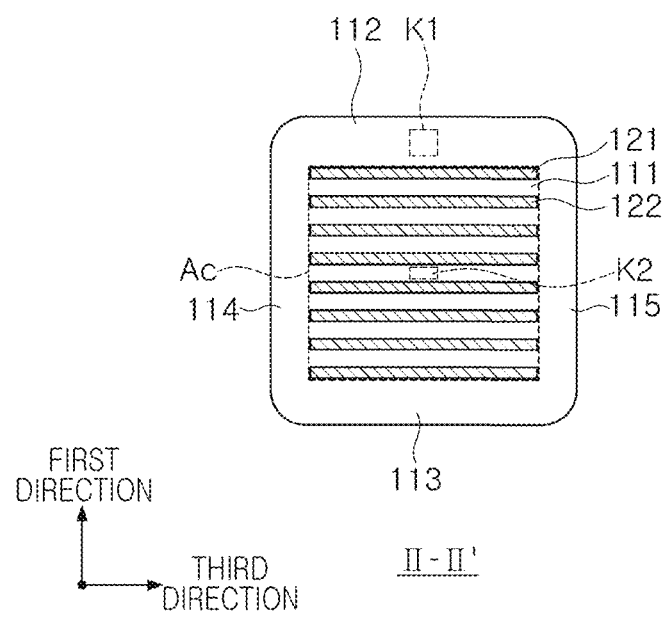
FIG. 3 is a cross-sectional view schematically illustrating the multilayer electronic component, taken along line II-II' as shown in FIG. 1.

FIG. 3 is a cross-sectional view schematically illustrating the multilayer electronic component, taken along line II-II' as shown in FIG. 1.

Figure 4:
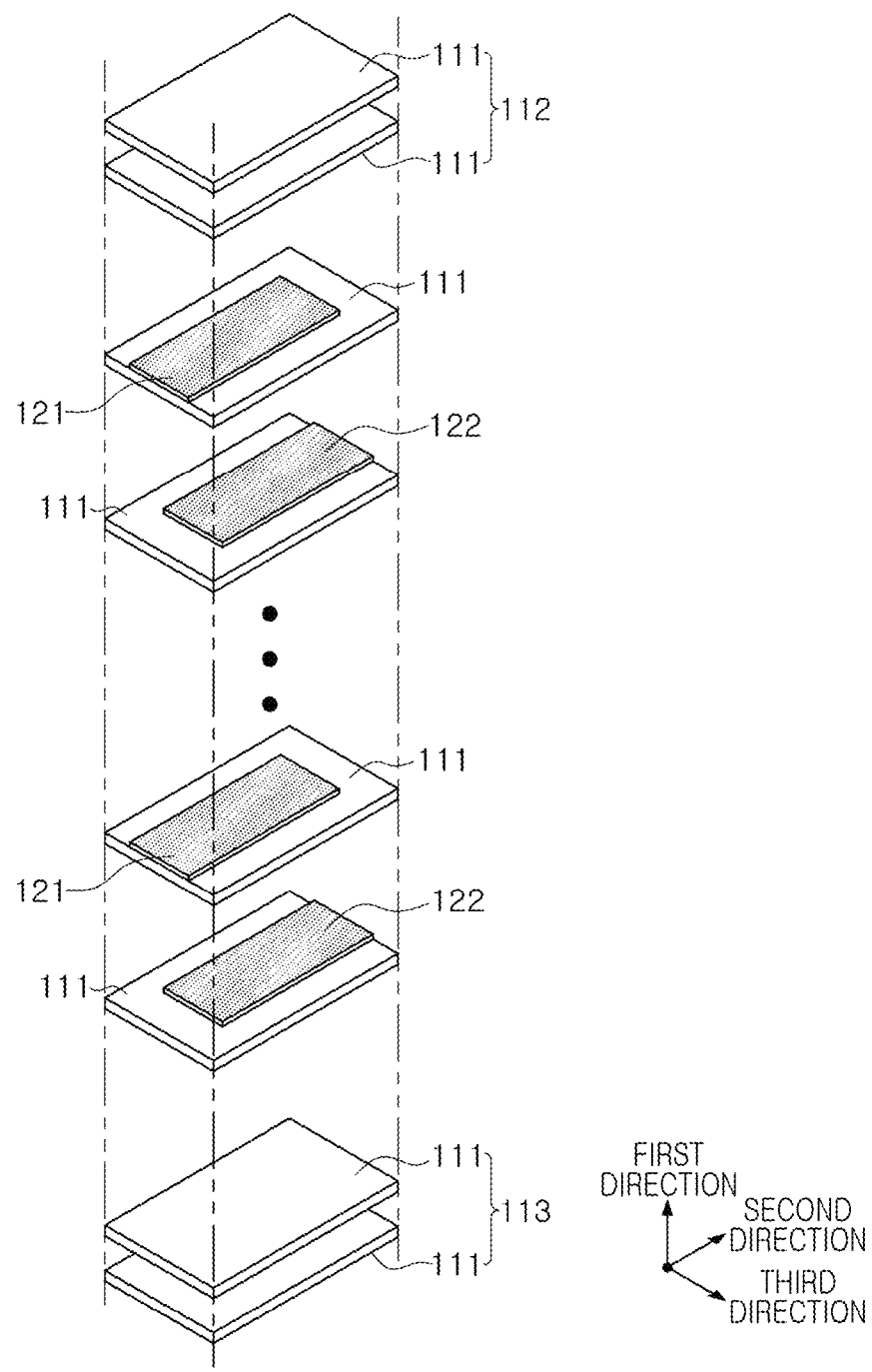
FIG. 4 is an exploded perspective view schematically illustrating a body of a multilayer electronic component according to an embodiment of the present disclosure.

FIG. 4 is an exploded perspective view schematically illustrating a body of a multilayer electronic component according to an embodiment of the present disclosure.

Figure 5:
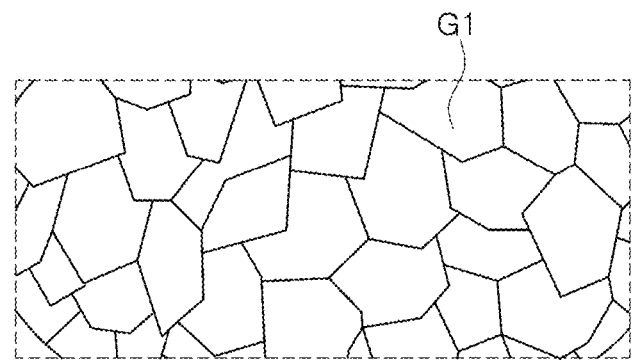
FIG. 5 is an enlarged view of region K1 shown in FIG. 3.

FIG. 5 is an enlarged view of region K1 shown in FIG. 3.

Figure 6:
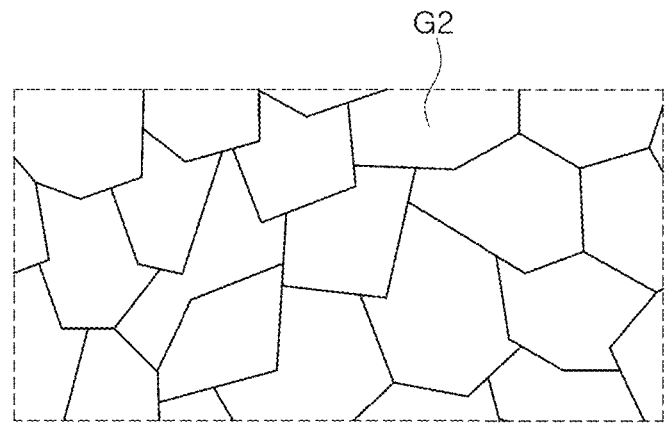
FIG. 6 is an enlarged view of region K2 shown in FIG. 3.

FIG. 6 is an enlarged view of region K2 shown in FIG. 3.

Referring to FIGS. 1 to 6, a multilayer electronic component 100 according to an embodiment of the present disclosure may include a body 110 including a capacitance formation portion Ac including a dielectric layer 111 and internal electrodes 121 and 122, and cover portions 112 and 113 disposed on both end surfaces of the capacitance formation portion opposing each other in the first direction; and an external electrodes 131 and 132 disposed outside the body and connected to the internal electrode, wherein the cover portions 112 and 113 contain fluorine (F), and A1 and A2 satisfy A2>A1, where A1 is an average size of a dielectric grain G1 included in the cover portions, and A2 is an average size of a dielectric grain G2 included in the dielectric layer.

According to an embodiment of the present disclosure, fluorine (F) contained in the cover portions 112 and 113 may serve as a low-temperature sintering aid to induce densification of the dielectric grains of the cover portions 112 and 113, to improve toughness of the cover portions. In addition, according to an embodiment of the present disclosure, A1 and A2 may satisfy A2>A1 to alleviate non-uniform stress distribution in the body 110 of the multilayer electronic component 100, to suppress occurrence of delamination, cracks, or the like, and, to improve, as a result, moisture resistance reliability of the multilayer electronic component.

Hereinafter, components included in a multilayer electronic component 100 according to an embodiment of the present disclosure will be described in more detail.

Although the detailed shape of the body 110 is not particularly limited, as illustrated, the body 110 may have a hexahedral shape or a shape similar thereto. Due to shrinkage of ceramic powder included in the body 110 or polishing of corners during a sintering process, the body 110 may not have a hexahedral shape with perfect straight lines, but may substantially have a hexahedral shape.

The body 110 may have the first and second surfaces 1 and 2 opposing in the first direction, the third and fourth surfaces 3 and 4 connected to the first and second surfaces 1 and 2 and opposing in the second direction, and the fifth and sixth surfaces 5 and 6 connected to the first to fourth surfaces 1, 2, 3 and 4 and opposing in the third direction.

In the body 110, the dielectric layer 111 and internal electrodes 121 and 122 may be alternately stacked. A plurality of dielectric layers 111 forming the body 110 may be in a sintered state, and a boundary between adjacent dielectric layers 111 may be integrated to the extent that it is difficult to confirm without using a scanning electron microscope (SEM).

The dielectric layer 111 may include, for example, $BaTiO_3$ as a main component. An average thickness td of the dielectric layer 111 is not particularly limited. In general, as a thickness of the dielectric layer 111 becomes thinner, cracks may be easily generated in the body 110 due to stress generated when voltage is applied, and therefore, there may be a problem in that moisture resistance reliability of the multilayer electronic component is lowered. In a multilayer electronic component according to an embodiment of the present disclosure, the cover portions 112 and 113 may include fluorine (F), and may satisfy A2>A1, to secure moisture resistance reliability of the multilayer electronic component, even when the average thickness td of the dielectric layer 111 is 0.4 μm or less.

In this case, the average thickness td of the dielectric layer 111 means a size of the dielectric layer 111 disposed between the internal electrodes 121 and 122 in the first direction. The average thickness of the dielectric layer 111 may be measured by scanning a plane of the body 110 in the first and second directions with a scanning electron microscope (SEM) at a magnification of 10,000. More specifically, the average thickness of the dielectric layer may be acquired by measuring thicknesses at a plurality of points of a dielectric layer 111, for example, at thirty points being located at equal intervals in the second direction. The thirty points located at equal intervals may be determined on a capacitance formation portion Ac to be described later. In addition, in a case in which the measurement of an average value is executed with respect to 10 dielectric layers, the average thickness of the dielectric layers 111 may be more generalized. Other methods and/or tools appreciated by one of ordinary skill in the art, even if not described in the present disclosure, may also be used.

The internal electrodes 121 and 122 may be alternately disposed, together with the dielectric layer 111. For example, a first internal electrode 121 and a second internal electrode 122, which may be a pair of electrodes having different polarities, may be arranged to oppose each other, with the dielectric layer 111 interposed therebetween. The first internal electrode 121 and the second internal electrode 122 may be electrically separated from each other by the dielectric layer 111 disposed therebetween.

The first internal electrode 121 may be spaced apart from the fourth surface 4 and connected to the third surface 3. In addition, the second internal electrode 122 may be disposed to be spaced apart from the third surface 3 and connected to the fourth surface 4.

A conductive metal included in the internal electrode (121 or 122) may include one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

An average thickness the of the internal electrode (121 or 122) is not particularly limited. In a multilayer electronic component according to an embodiment of the present disclosure, the cover portions 112 and 113 may include fluorine (F), and may satisfy A2>A1, to secure moisture resistance reliability of the multilayer electronic component, even when the average thickness of the internal electrode (121 or 122) is 0.4 μm or less.

The average thickness the of the internal electrodes 121 and 122 means a size of the internal electrodes 121 and 122 in the first direction. In this case, the average thickness of the internal electrodes 121 and 122 may be measured by scanning a plane of the body 110 in the first and second directions with a scanning electron microscope (SEM) at a magnification of 10,000. More specifically, the average thickness of the internal electrodes 121 and 122 may be acquired by measuring thicknesses at a plurality of points of one internal electrode, for example, at thirty points being located at equal intervals in the second direction. The thirty points at equal intervals may be determined on a capacitance formation portion Ac to be described later. In addition, when in a case in which the measurement of an average value is executed with respect to 10 internal electrodes 121 and 122, the average thickness of the internal electrodes 121 and 122 may be more generalized. Other methods and/or tools appreciated by one of ordinary skill in the art, even if not described in the present disclosure, may also be used.

The body 110 may include a capacitance formation portion Ac disposed in the body 110 and including the dielectric layer 111 and the internal electrodes 121 and 122 alternately disposed, and cover portions 112 and 113 respectively disposed on opposite surfaces of the capacitance formation portion Ac in the first direction. The cover portions 112 and 113 may include a first cover portions 112 and a second cover portions 113, respectively disposed on both surfaces of the capacitance formation portion Ac opposing in the first direction. The cover portions 112 and 113 may basically play a role in preventing damage to the internal electrodes due to physical or chemical stress.

Main components of the cover portions 112 and 113 may be the same as that of the dielectric layer 111, and therefore, the cover portions 112 and 113 may include, for example, $BaTiO_3$ as the main components. In addition, the cover portions 112 and 113 may include at least one of Ca, Al, Li, Co, Zn, Mn, Mg, or S. For example, the cover portions 112 and 113 may include a subsidiary component including an oxide or a carbonate including at least one of Ca, Al, Li, Co, Zn, Mn, Mg, and S. An element of the subsidiary component do not necessarily exist as an oxide or a carbonate. As will be described later, the Ca, Al, Li, Co, Zn, Mn, Mg, and S, together with fluorine (F) contained in the cover portions 112 and 113, may serve as low-temperature sintering aids.

According to an embodiment of the present disclosure, the cover portions 112 and 113 may include fluorine (F). The fluorine (F) contained in the cover portions may originate from a fluorine-based compound included in a first ceramic slurry for forming the cover portions 112 and 113.

The fluorine (F) may serve as a low-temperature sintering aid in a sintering process of the cover portions 112 and 113. Therefore, the cover portions 112 and 113 may be sintered at a low temperature due to the fluorine (F), and thus densities of the cover portions 112 and 113 may be improved. In addition, the fluorine (F) contained in the cover portions 112 and 113 may combine with other elements included in the cover portions 112 and 113, to form a kind of compound. For example, fluorine (F) may be combined with Ca, Al, Li, Co, Zn, Mn, Mg, and/or S, included in the cover portions 112 and 113, to form a compound such as $CaF$, $AlF_3$, and/or $LiF$, or the like. When the cover portions 112 and 113 are sintered, the compound may induce liquid phase sintering of $BaTiO_3$, to induce densification of the cover portions 112 and 113.

Referring to FIGS. 5 and 6, A1 and A2 may satisfy A2>A1, where A1 is an average size of a dielectric grain G1 included in the cover portion, and A2 is an average size of a dielectric grain G2 included in the dielectric layer.

A first dielectric material, which may be a raw material for forming the cover portions 112 and 113, and a second dielectric material, which may be a raw material for forming the dielectric layer 111 of the capacitance formation portion Ac, may have a powder form. In this case, when a particle diameter of the first dielectric material is equal to a particle diameter of the second dielectric material the same, sintering of the dielectric layer 111 may occur earlier than the cover portions 112 and 113. This may be because compressive stress acts on the dielectric layer 111 disposed between the internal electrodes due to preferential shrinkage of the internal electrodes including the conductive metal having a lower sintering temperature than the dielectric material, and acts as a driving force for sintering. As such, since the dielectric layer 111 may be sintered earlier than the cover portions 112 and 113, stress may be unevenly distributed in the body 110, which may cause defects such as delamination, cracks, or the like.

Therefore, sintering temperatures of the cover portions 112 and 113 may be lowered by making the particle diameter of the first dielectric material smaller than the particle diameter of the second dielectric material, to reduce a difference in sintering temperature with the capacitance formation portion Ac. Therefore, a multilayer electronic component according to an embodiment of the present disclosure may satisfy A2>A1. For example, the multilayer electronic component may satisfy A2>A1 to alleviate non-uniform stress distribution in the body 110.

When the average size A1 of the dielectric grains G1 included in the cover portions 112 and 113 after sintering is too small, toughness of the cover portions 112 and 113 may deteriorate. In an embodiment of the present disclosure, fluorine (F) contained in the cover portions 112 and 113 may serve as a low-temperature sintering aid to induce grain growth of dielectric grains, to improve toughness of the cover portions 112 and 113. Therefore, occurrence of cracks or the like due to external impact may be prevented and penetration of external moisture into the capacitance formation portion may be prevented, to improve moisture resistance reliability of the multilayer electronic component.

The average size A1 of the dielectric grains G1 included in the cover portions 112 and 113 is not particularly limited, but may be, for example, 200 nm or more. When A1 is less than 200 nm, an effect of improving toughness of the cover portions 112 and 113 may be insignificant. An upper limit of A1 is not particularly limited, but may be, for example, 400 nm or less.

The A1/A2 ratio is not particularly limited, but may satisfy, for example, $0.55 \leq A1/A2 \leq 0.585$. A method of adjusting the A1/A2 values is not particularly limited, but the particle diameter of the first dielectric material forming the cover portions 112 and 113 may be smaller than that of the second dielectric material forming the dielectric layer 111, but, as an amount of fluorine (F) contained in the cover portions 112 and 113 increases, grain growth of the dielectric grains G1 included in the cover portions 112 and 113 may be promoted to increase a value of A1/A2. When the value of A1/A2 is less than 0.55, an effect of improving toughness of the cover portions 112 and 113 may be insignificant. When the value of A1/A2 is greater than 0.585, an amount of a fluorine-based compound included in a cover portion pattern to be described later may be excessive, and thus the fluorine-based compound may be agglomerated.

The A1 may mean an average value of sizes of dielectric grains, acquired by obtaining an image from a central region (e.g., portion "K1" in FIG. 3) of the cover portions 112 and 113 with a scanning electron microscope (SEM) at a magnification of 50,000, in a plane of the body in the first and third directions, cut at a center in the second direction, and then analyzing the image using an image analysis program, for example, The Zootos Program by Zootos. Other methods and/or tools appreciated by one of ordinary skill in the art, even if not described in the present disclosure, may also be used.

In addition, the A2 may mean an average value of sizes of dielectric grains, acquired by obtaining an image from a central region (e.g., portion "K2" in FIG. 3) of the capacitance formation portion Ac with a scanning electron microscope (SEM) at a magnification of 50,000, in a plane of the body in the first and third directions, cut at a center in the second direction, and then analyzing the image using an image analysis program, for example, The Zootos Program by Zootos. Other methods and/or tools appreciated by one of ordinary skill in the art, even if not described in the present disclosure, may also be used.

The dielectric layer 111 may not include fluorine (F), but the present disclosure is not limited thereto. For example, the dielectric layer 111 may include a lower amount of fluorine (F) than the cover portions 112 and 113, to implement antistatic properties of a fluorine-based compound, which will be described later.

A method of measuring fluorine (F) contained in the cover portions 112 and 113 and dielectric layer 111 is not particularly limited. For example, fluorine (F) contained in the cover portions 112 and 113 and dielectric layer 111 may be measured through negative ion analysis by time-of-flight secondary ion mass spectrometry (TOF-SIMS). Other methods and/or tools appreciated by one of ordinary skill in the art, even if not described in the present disclosure, may also be used.

A fluorine ion (F) may be detected in the cover portions 112 and 113, when negative ions may be analyzed by time-of-flight secondary ion mass spectrometry (TOF-SIMS). For example, after etching an outer surface of the cover portions 112 and 113 disposed on the first or second surface of the body 110 by about 10 nm, fluorine (F) contained in the cover portions 112 and 113 may be measured by performing time-of-flight secondary ion mass spectrometry (TOF-SIMS) on an area of a size in the second direction×a size in the third direction=100 μm×100 μm.

In the negative ion analysis of the cover portions 112 and 113 by time-of-flight secondary ion mass spectrometry (TOF-SIMS), a ratio of detection intensity of the fluorine ion (F) with regard to detection intensity of all negative ions may range from 5.78% to 12.56%. The detection intensity of the fluorine ion ($F^-$) may be determined by an amount of a fluorine-based compound included in a cover portion pattern to be described later. When the ratio of the detection intensity of the fluorine ion ($F^-$) is less than 5.78%, an effect of improving toughness of the cover portions 112 and 113 may be insignificant. In addition, when the ratio of the detection intensity of the fluorine ion ($F^-$) is greater than 12.56%, the content of the fluorine-based compound included in the cover portion pattern may be excessive, to aggregate the fluorine-based compound.

The method of measuring fluorine (F) contained in the cover portions 112 and 113 is not limited thereto, and the fluorine (F) contained in the cover portions 112 and 113 may be measured, for example, by X-ray photoelectron spectroscopy, infrared spectroscopy, or the like.

An average thickness tc of the cover portions 112 and 113 is not particularly limited. The average thickness tc of the cover portions 112 and 113 may be 15 μm or less to reduce a size and increase capacitance of the multilayer electronic component. As described above, even when the average thickness of the cover portions 112 and 113 is 15 μm or less, the cover portions 112 and 113 may contain fluorine (F) and A1 and A2 may satisfy A2>A1, to provide moisture resistance reliability of the multilayer electronic component. In this case, the average thickness tc of the cover portions 112 and 113 means an average thickness of the first cover portion 112 and an average thickness of the second cover portion 113, respectively.

The average thickness tc of the cover portions 112 and 113 may mean an average size of the cover portions 112 and 113 in the first direction, and may be an average value of sizes in the first direction, measured at five equally spaced points in a plane of the body 110 in the first and second directions. The thickness of the cover portions 112 and 113 may be determined by using a scanning electron microscope (SEM). Other methods and/or tools appreciated by one of ordinary skill in the art, even if not described in the present disclosure, may also be used.

The body 110 may include margin portions 114 and 115 disposed on both end surfaces of the capacitance formation portion Ac opposing each other in the third direction. For example, the margin portions 114 and 115 may refer to regions between both ends of the internal electrodes 121 and 122 and a boundary surface of the body 110, in a plane of the body 110 cut in the first and third directions. In this case, the margin portions 114 and 115 may include a first margin portion 114 connected to the fifth surface 5 of the body 110 and a second margin portion 115 connected to the sixth surface 6 of the body 110.

The margin portions 114 and 115 may include the same material as the dielectric layer 111, except that the internal electrodes 121 and 122 is not included. The margin portions 114 and 115 may basically serve to prevent damage to the internal electrodes 121 and 122 due to physical or chemical stress.

The margin portions 114 and 115 may be formed by coating and sintering a conductive paste for internal electrodes on a ceramic green sheet, except for regions in which the margin portions are formed. Alternatively, to suppress a step difference caused by the internal electrodes 121 and 122, after stacking, the internal electrodes 121 and 122 may be cut to be connected to the fifth and sixth surfaces 5 and 6 of the body, and then a single dielectric layer or two or more dielectric layers may be stacked on both surfaces of the capacitance formation portion Ac opposing each other in the third direction, to form the margin portions 114 and 115.

An average thickness of the margin portions 114 and 115 is not particularly limited. The average thickness of the margin portions 114 and 115 may be 15 μm or less for miniaturization and high capacitance of the multilayer electronic component. As described above, even when the average thickness of the margin portions 114 and 115 is 15 μm or less, the cover portions 112 and 113 may contain fluorine (F) and A1 and A2 may satisfy A2>A1, to acquire moisture resistance reliability of the multilayer electronic component. In this case, the average thickness of the margin portions 114 and 115 means an average thickness of the first margin portion 114 and an average thickness of the second margin portion 115, respectively.

The average thickness of the margin portions 114 and 115 may mean an average size of the margin portions 114 and 115 in the third direction, and may be an average value of sizes in the third direction, measured at five equally spaced points in a plane of the body 110 in the first and third directions. The thickness of the margin portions 114 and 115 may be determined by using a scanning electron microscope (SEM). Other methods and/or tools appreciated by one of ordinary skill in the art, even if not described in the present disclosure, may also be used.

The external electrodes 131 and 132 may be disposed outside the body 110, and may be connected to the internal electrodes 121 and 122. The external electrodes 131 and 132 may be disposed on the third and fourth surfaces 3 and 4 of the body 110, respectively, and may be extended to on portions of the first, second, fifth, and sixth surfaces. In addition, the external electrodes 131 and 132 may include a first external electrode 131 connected to a plurality of first internal electrodes 121, and a second external electrode 132 connected to a plurality of second internal electrodes 122.

The external electrodes 131 and 132 may include first electrode layers 131a and 132a disposed on the third and fourth surfaces 3 and 4 of the body 110, respectively, and connected to the internal electrodes 121 and 122, and second electrode layers 131b and 132b disposed on the first electrode layers 131a and 132a.

The first electrode layers 131a and 132a may include metal and glass, and the metal included in the first electrode layers 131a and 132a may include copper (Cu), nickel (Ni), palladium (Pd), platinum (Pt), gold (Au), silver (Ag), lead (Pb), an alloy including the same, and/or the like, but the present disclosure is not limited thereto.

The second electrode layers 131b and 132b may improve mounting characteristics. Types of the second electrode layers 131b and 132b are not particularly limited, and may be a plating layer including nickel (Ni), tin (Sn), palladium (Pd), an alloy including the same, and/or the like, or may be formed as a plurality of layers. The second electrode layers 131b and 132b may be, for example, a nickel (Ni) plating layer or a tin (Sn) plating layer, or may have a configuration in which a nickel (Ni) plating layer and a tin (Sn) plating layer are sequentially formed. Also, the second electrode layers 131b and 132b may include a plurality of nickel (Ni) plating layers and/or a plurality of tin (Sn) plating layers.

Hereinafter, a method of manufacturing a multilayer electronic component according to an embodiment of the present disclosure for manufacturing the above-described multilayer electronic component will be described. However, overlapping descriptions of the above-described multilayer electronic component according to an embodiment of the present disclosure will be omitted.

Method of manufacturing Multilayer Electronic Component

A method for manufacturing a multilayer electronic component including a body 110 including a capacitance formation portion Ac including a dielectric layer 111 and internal electrodes 121 and 122, alternately disposed in a first direction, and cover portion 112 and 113 disposed on both end surfaces of the capacitance formation portion opposing each other in the first direction; and an external electrodes 131 and 132 disposed outside the body and connected to the internal electrode, according to an embodiment of the present disclosure, includes a printing process of performing any one of a process of forming a cover portion pattern by printing a first ceramic slurry containing a first dielectric material and a fluorine-based compound, a process of forming a dielectric pattern by printing a second ceramic slurry containing a second dielectric material, and a process of forming an internal electrode pattern by printing a conductive paste for the internal electrode including a conductive particle for the internal electrode; a stacking process of performing the printing process a plurality of times to obtain a stack body in which the cover portion pattern, the dielectric pattern, and the internal electrode pattern are stacked; a sintering process of sintering the stack body to obtain the body; and a process of forming the external electrode outside the body, wherein the first dielectric material includes $BaTiO_3$ as a main component, and an amount of a fluorine-based compound included in the first ceramic slurry is 0.2 to 1.0 parts by weight, relative to 100 parts by weight of $BaTiO_3$.

The process of forming the cover portion pattern may include a process of printing and drying a first ceramic slurry containing a first dielectric material, a fluorine-based compound, and an organic solvent, a binder, a dispersant, or the like, as needed, in the process, on a carrier film.

The first dielectric material included in the first ceramic slurry may include $BaTiO_3$ as a main component, and may include at least one of Ca, Al, Li, Co, Zn, Mn, Mg, and S. For example, the first dielectric material may include a subsidiary component including an oxide or a carbonate including at least one of Ca, Al, Li, Co, Zn, Mn, Mg, and S. The present disclosure is not limited thereto, and as described above, it is preferable to further include other elements capable of realizing a low-temperature sintering effect by combining with fluorine (F).

Figure 7:
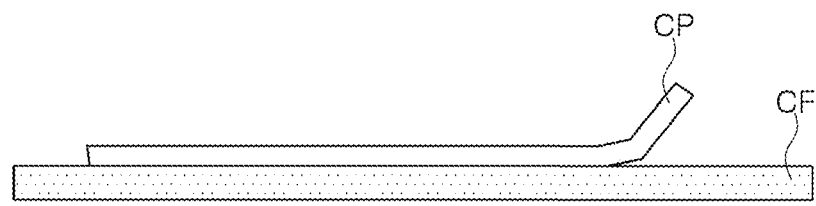
FIG. 7 is a cross-sectional view schematically illustrating a process of peeling a cover portion pattern from a carrier film.

The fluorine-based compound may serve as an antistatic agent in the first ceramic slurry. FIG. 7 is a cross-sectional view schematically illustrating a process of peeling a cover portion pattern from a carrier film. Referring to FIG. 7, when a cover portion pattern CP is peeled from a carrier film CF, static electricity may be generated due to friction and/or an energy level difference between materials, and such static electricity may generate folding and/or wrinkle defects of the cover portion pattern to cause a decrease in withstand voltage and a short circuit failure in a multilayer electronic component.

According to an embodiment of the present disclosure, a cover portion pattern CP may include a fluorine-based compound, and the fluorine-based compound may form a kind of conductive layer on a surface of the cover portion pattern CP. Therefore, static electricity generated when a cover portion pattern CP is peeled from a carrier film CF may be removed by a hopping effect, to prevent folding and/or wrinkle defects of the cover portion pattern CP.

According to an embodiment of the present disclosure, an amount of the fluorine-based compound included in the first ceramic slurry may be 0.2 to 1.0 parts by weight, relative to 100 parts by weight of $BaTiO_3$. When the amount of the fluorine-based compound is less than 0.2 parts by weight, relative to 100 parts by weight of $BaTiO_3$, a static electricity removing effect of the fluorine-based compound may be insignificant. In addition, when the amount of the fluorine-based compound is greater than 1.0 part by weight, relative to 100 parts by weight of $BaTiO_3$, compatibility between organic materials included in the first ceramic slurry may be deteriorated, resulting in deterioration in dispersibility of the fluorine-based compound such as aggregation of the fluorine-based compound, or the like.

The fluorine-based compound may be added to the first ceramic slurry, after adding a subsidiary component including at least one of Ca, Al, Li, Co, Zn, Mn, Mg, and S, to prevent deterioration in dispersibility.

A type of the fluorine-based compound is not particularly limited. For example, the fluorine-based compound may include at least one of compounds represented by Formulas 1 to 4 below:

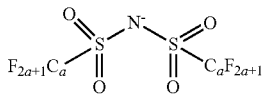

[Formula 1]

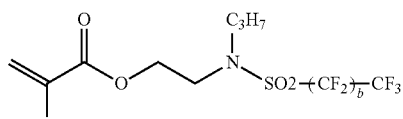

[Formula 2]

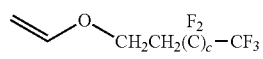

[Formula 3]

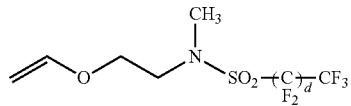

[Formula 4]

In Formulas 1 to 4, a, b, c and d may be independently an integer of 100 to 1000, respectively.

The process of forming the dielectric pattern may include a process of printing and drying a second ceramic slurry containing a second dielectric material on a carrier film. The second dielectric material may be the same as or different from the first dielectric material, and the second ceramic slurry may include an organic solvent, a binder, a dispersant, or the like, as needed, in the process. As described above, an average particle diameter of the second dielectric material may be greater than an average particle diameter of the first dielectric material.

The dielectric pattern may not include a fluorine-based compound, but the present disclosure is not limited thereto. For example, to implement antistatic properties, the dielectric pattern may include a lower amount of fluorine (F) than the cover portion pattern.

The process of forming the internal electrode pattern may include a process of printing a conductive paste for internal electrodes including conductive particles for internal electrodes on the dielectric pattern by a predetermined thickness. As the process for printing the conductive paste for internal electrodes, a screen-printing method, a gravure printing method, or the like may be used, but the present disclosure is not limited thereto.

According to an embodiment of the present disclosure, a printing process of performing any one of a process of forming the cover portion pattern, a process of forming the dielectric pattern, and a process of forming the internal electrode pattern may be included, and a stacking process of performing the printing process a plurality of times to obtain a stack body in which the cover portion pattern, the dielectric pattern, and the internal electrode pattern are stacked may be included.

For example, according to an embodiment of the present disclosure, after stacking at least one cover portion pattern to form the second cover portion 113, the internal electrode pattern and the dielectric pattern may be alternately stacked on the cover portion pattern to form a capacitance formation portion, before sintering. Next, at least one cover portion pattern to form the first cover portions 112 may be stacked to obtain a stack body in which the cover portion pattern, the dielectric pattern, and the internal electrode pattern are stacked.

Next, a sintering process of obtaining the body 110 by sintering the stack body may be included. In the sintering step, a sintering temperature is not particularly limited, the cover portion pattern may form the cover portions 112 and 113 after sintering, the dielectric pattern may form the dielectric layer 111 after sintering, and the internal electrode pattern may form the internal electrode after sintering.

Next, a process of forming external electrodes 131 and 132 outside the body 110 may be included. Specifically, the first electrode layers 131a and 132a may be formed by dipping the third and fourth surfaces of the body 110 into a conductive paste for external electrodes containing metal and glass, and then performing sintering. Thereafter, second electrode layers 131b and 132b may be formed on the first electrode layers 131a and 132a using an electroplating method and/or an electroless plating method.

Experimental Example

<Evaluation of Electrostatic Force and Peel Force>

First, $BaTiO_3$ powder was weighed and pulverized, and the $BaTiO_3$ powder was mixed with a binder, an organic solvent, and a dispersant. Next, a subsidiary component including at least one of Ca, Al, Li, Co, Zn, Mn, Mg, and S was added, and then a fluorine-based compound was added as an antistatic agent to prepare a first ceramic slurry. Next, the first ceramic slurry was printed on a carrier film, and dried to form a sample pattern.

In this case, an amount of the fluorine-based compound was varied for each test number, and the amount of the fluorine-based compound illustrated in Table 1 below was measured, relative to 100 parts by weight of $BaTiO_3$ included in the first ceramic slurry. Next, electrostatic force and peeling force generated when the sample pattern was peeled from the carrier film were measured, and listed in Table 1 below.

The electrostatic force generated when the sample pattern was peeled from the carrier film was measured using a Keyence SK-50 sensor, and the peel force generated when the sample pattern was peeled from the carrier film by applying a force to the sample pattern at a 90° angle was measured by UTM (Universal Test Machine).

TABLE 1

| Test No. | Fluorine-based Compound Amount (parts by weight) | Electrostatic Force (kV) | Peel Force (mN/4 cm) | Aggregation |
|---|---|---|---|---|
| 1 | 0 | 36.3 ± 2.4 | 51.6 ± 7.8 | X |
| 2 | 0.2 | 32.7 ± 6.7 | 47.9 ± 15.4 | X |
| 3 | 0.4 | 24.1 ± 1.6 | 34.7 ± 4.7 | X |
| 4 | 0.6 | 11.5 ± 1.2 | 16.3 ± 2.4 | X |
| 5 | 1.0 | 1.2 ± 1.4 | 9.7 ± 4.1 | X |
| 6 | 1.2 | -4.7 ± 1.4 | 4.3 ± 4.0 | ○ |
| 7 | 1.5 | -9.3 ± 1.5 | 1.2 ± 4.1 | ○ |

Referring to Table 1, it can be seen that electrostatic force and peel force decreased, as an amount of the fluorine-based compound increased. Therefore, it was confirmed that folding and/or wrinkle defects of the cover portion pattern were prevented, as an amount of the fluorine-based compound increased.

In Test Nos. 6 and 7, it can be confirmed that aggregation of the fluorine-based compound occurred when the amount of the fluorine-based compound exceeds 1.0 mol, relative to 100 parts by weight of $BaTiO_3$. Therefore, it can be seen that the amount of the fluorine-based compound included in the first ceramic slurry is preferably 0.2 to 1.0 parts by weight, relative to 100 parts by weight of $BaTiO_3$.

Figure 8:
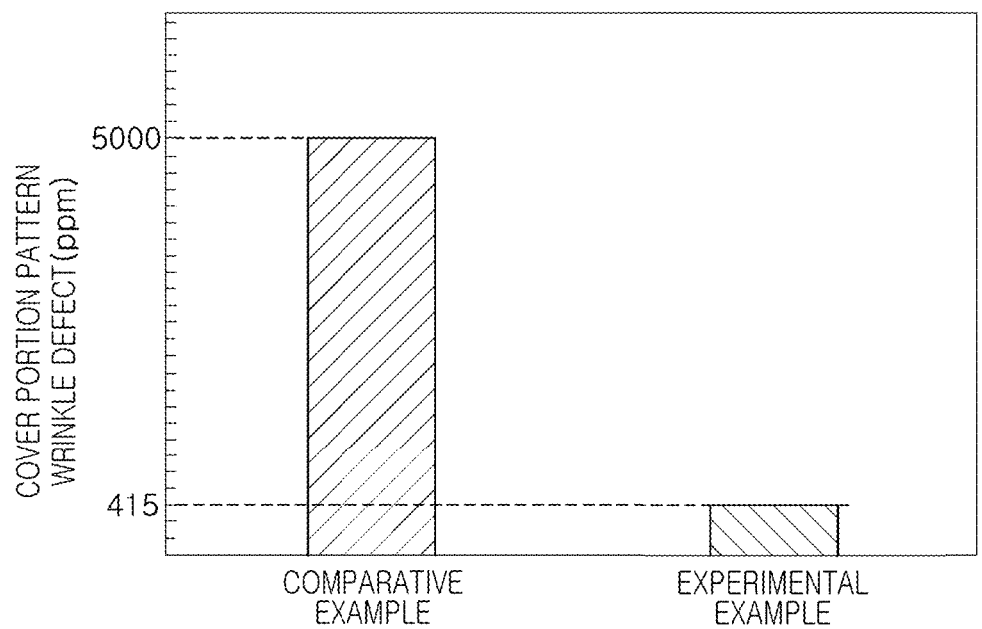
FIG. 8 is a graph illustrating a wrinkle defect rate of a cover portion pattern in an experimental example and a comparative example.
Figure 9:
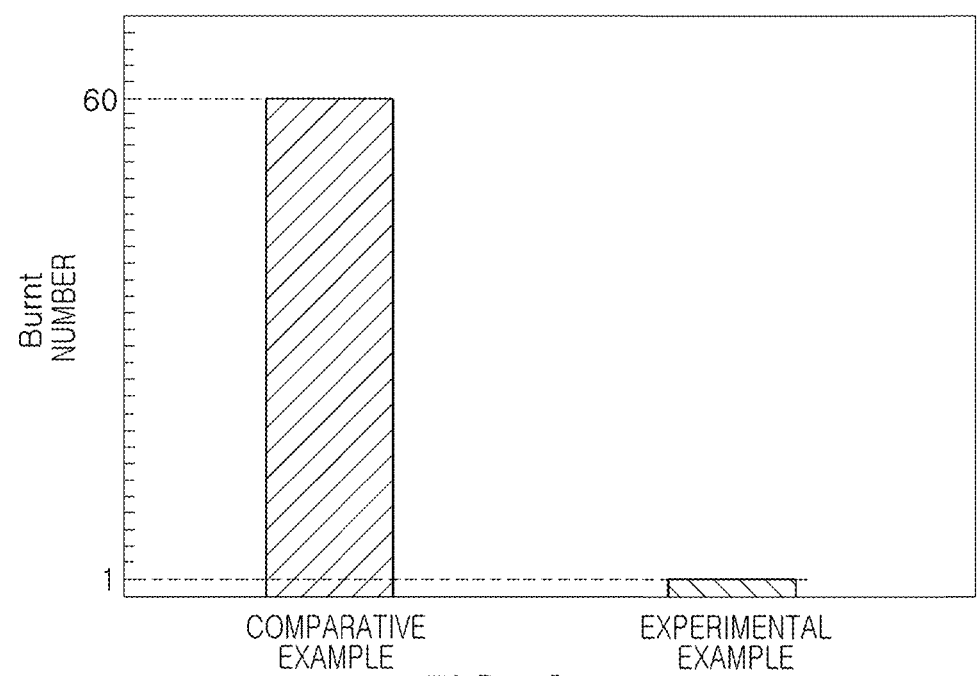
FIG. 9 is a graph illustrating the number of burn defects due to folding of a cover portion pattern in an experimental example and a comparative example.

FIG. 8 is a graph illustrating a wrinkle defect rate of a cover portion pattern in an experimental example and a comparative example. FIG. 9 is a graph illustrating the number of burn defects due to folding of a cover portion pattern in an experimental example and a comparative example. In this case, the wrinkle defect rate of the cover portion pattern may mean a ratio of the cover portion pattern that is folded or wrinkled, in analyzing a cross-section of a sample in which the cover portion pattern is stacked.

The number of burn defects may mean the number of times in which burn marks are generated on a stacked subsidiary material due to static electricity generated between the cover portion pattern and the stacked subsidiary material, when the cover portion pattern is stacked.

In this case, the wrinkle defect rate of the cover portion pattern was measured for 1,000 samples in each of the experimental and comparative examples, and the number of burn defects occurred on the burn mark on the stacked subsidiary material after stacking 50,000 cover portion patterns in each of the experimental and comparative examples. The experimental example was a sample pattern in which an amount of the fluorine-based compound included in the sample pattern was 0.6 parts by weight, relative to 100 parts by weight of $BaTiO_3$, and the comparative example was a sample pattern that did not include a fluorine-based compound.

Referring to FIGS. 8 and 9, in the comparative example, the wrinkle defect rate of the cover portion pattern reached 5000 ppm and the number of burns reached 50 times in total, but in the experimental example, the wrinkle defect rate of the cover portion pattern was 415 ppm and the number of burns was only 1 time. Therefore, it was confirmed that folding and wrinkle defects were prevented by forming the cover portion pattern with a ceramic slurry containing a fluorine-based compound.

<Evaluation of Average Size, Density, Toughness, and Moisture Resistance Reliability of Dielectric Grains>

Next, cover portions were formed with a sample pattern of each test number, but a dielectric layer and internal electrodes were formed in the same manner, and after sintering a stack body, external electrodes connected to the internal electrodes may be formed outside a body to prepare a sample chip. In this case, a fluorine-based compound was not added to a dielectric pattern forming the dielectric layer.

Next, an outer surface of the cover portions disposed on a first or second surface of each sample chip may be etched by a depth of about 10 nm, and then time-of-flight secondary ion mass spectrometry (TOF-SIMS) was performed on an area of a size in the second direction×a size in the third direction=100 μm×100 μm. In this case, a ratio of detection intensity of the fluorine ion (F) with regard to detection intensity of all negative ions was measured and illustrated in Table 2 below.

Next, an average size A1 of dielectric grains included in the cover portions was measured. An average value of sizes of the dielectric grains was determined by obtaining an image from a central region of the cover portions with a scanning electron microscope (SEM) at a magnification of 50,000, in a plane of the body in the first and third directions, cut at a center in the second direction, and then analyzing the image using the Zootos Program by Zootos, and A1/A2 values thereof are listed in Table 2 below.

In addition, the number of pores in the image captured from the central region of the cover portions with a scanning electron microscope (SEM), was determined based on a contrast difference with the dielectric grains, and the number of pores per unit area was then listed in Table 2 below. Additionally, the outer surface of the cover portions disposed on the first or second surface was measured for toughness of the cover portions using a Vickers hardness tester.

TABLE 2

| Test No. | Fluorine Ion Detection Intensity (%) | A1/A2 | Pore Count per Unit Area (pore count/μm²) | Toughness (MPa · m$^{1/2}$) |
|---|---|---|---|---|
| 1 | 4.56 | 0.547 | 40,533 | 1.11 |
| 2 | 5.78 | 0.55 | 33,682 | 1.24 |
| 3 | 6.21 | 0.554 | 26,224 | 1.42 |
| 4 | 8.81 | 0.563 | 12,800 | 1.67 |
| 5 | 12.56 | 0.585 | 4,156 | 1.92 |
| 6 | 15.27 | 0.607 | 2,788 | 2.34 |
| 7 | 17.02 | 0.658 | 612 | 2.91 |

Referring to Table 2, it can be seen that detection intensity of fluorine ions (F⁻) of the cover portions increased, as an amount of a fluorine-based compound included in a cover portion pattern increased, by time-of-flight secondary ion mass spectrometry (TOF-SIMS).

In addition, it can be confirmed that an A1/A2 value increased by promoting grain growth of dielectric grains included in the cover portions, as the detection intensity of fluorine ions (F) of the cover portions increased, and it can be seen that toughness of the cover portions increased according to the grain growth of the dielectric grains. In addition, it can be confirmed that, as detection intensity of fluorine ions ($F^-$) of the cover portions increased, density of the cover portions was improved, and thus the number of pores per unit area decreased.

As described above, when the amount of the fluorine-based compound exceeded, dispersibility of the fluorine-based compound may decrease and aggregation may occur. In the negative ion analysis, a ratio of detection intensity of the fluorine ion ($F^-$) with regard to detection intensity of all negative ions was preferably 5.78% to 12.56%.

FIGS. 10A, 10B, 11A, 11B, 12A, and 12B will be described below. Hereinafter, an experimental example was a sample chip using a cover portion pattern in which an amount of a fluorine-based compound was 0.6 parts by weight, relative to 100 parts by weight of $BaTiO_3$, and a comparative example was a sample chip using a cover portion pattern that did not contain a fluorine-based compound.

Figure 10A:
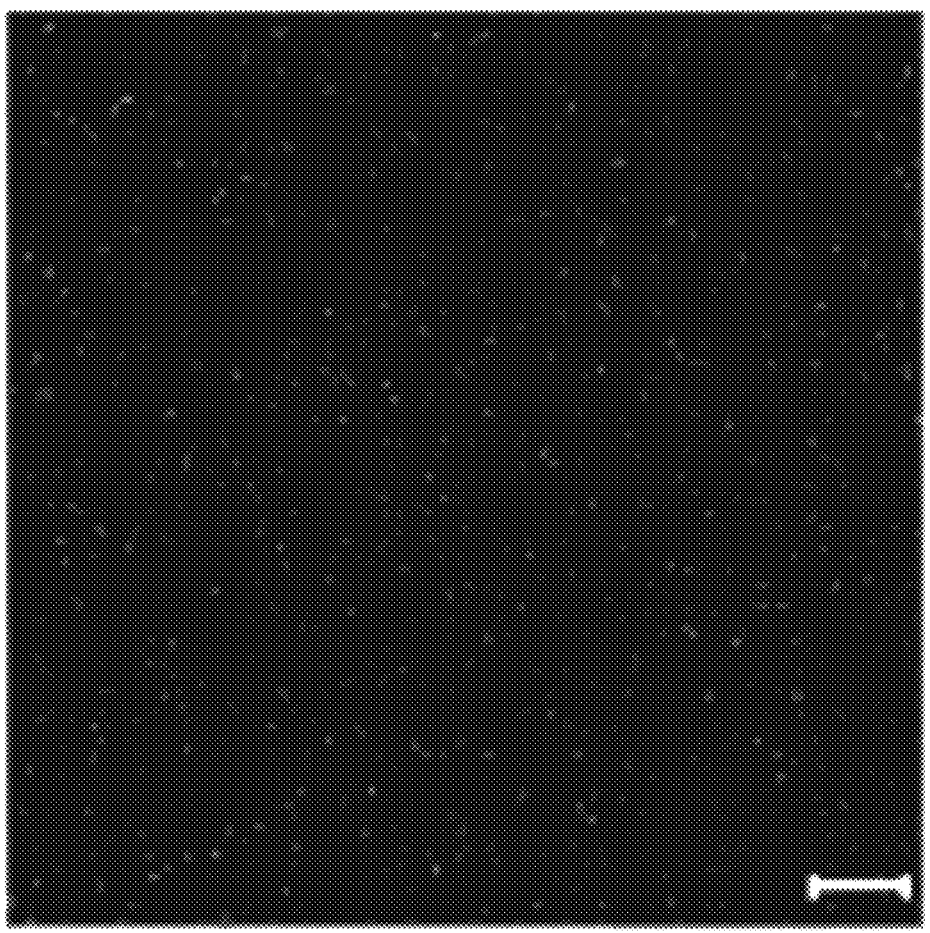
FIG. 10A is a mapped image of fluorine ions (F) detected in negative ion analysis by time-of-flight secondary ion mass spectrometry (TOF-SIMS) of a cover portion of an experimental example.
Figure 10B:
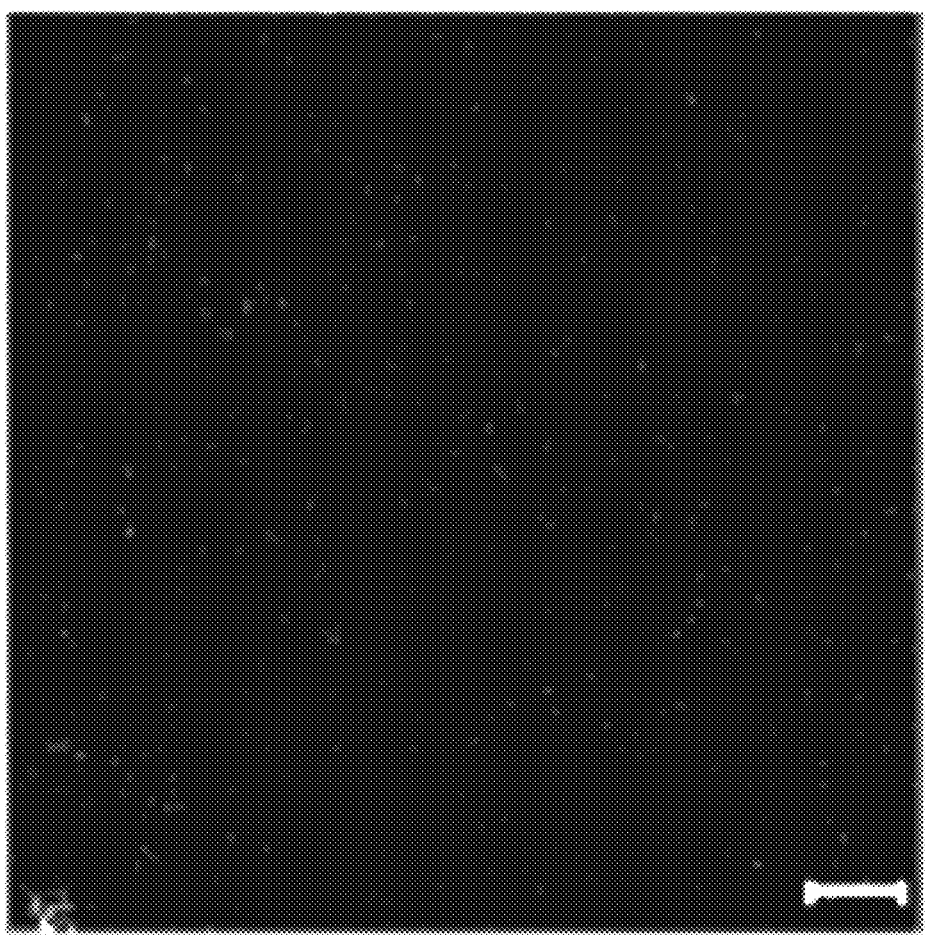
FIG. 10B is a mapped image of fluorine ions (F−) detected in negative ion analysis by time-of-flight secondary ion mass spectrometry (TOF-SIMS) of a cover portion of a comparative example.

FIG. 10A is a mapped image of fluorine ions (F) detected in negative ion analysis by time-of-flight secondary ion mass spectrometry (TOF-SIMS) of a cover portion of an experimental example. FIG. 10B is a mapped image of fluorine ions ($F^-$) detected in negative ion analysis by time-of-flight secondary ion mass spectrometry (TOF-SIMS) of a cover portion of a comparative example.

Referring to FIGS. 10A and 10B, it can be confirmed that detection intensity of fluorine ions of the cover portions detected in negative ion analysis by time-of-flight secondary ion mass spectrometry (TOF-SIMS) increased in adding the fluorine-based compound to the cover portion pattern. In FIG. 10B, it can be expected that a small amount of fluorine ion ($F^-$) is detected due to noise, although the cover portions were formed with a cover portion pattern that did not include a fluorine-based compound.

Figure 11A:
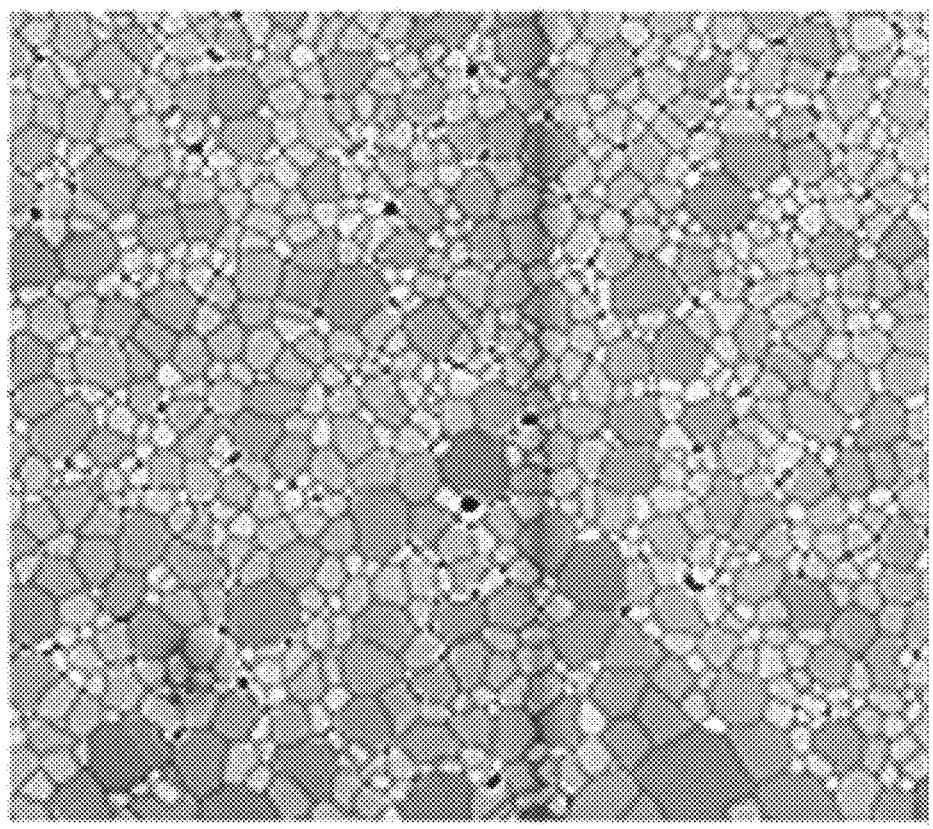
FIG. 11A is an image of a cover portion of an experimental example captured with a scanning electron microscope (SEM).
Figure 11B:
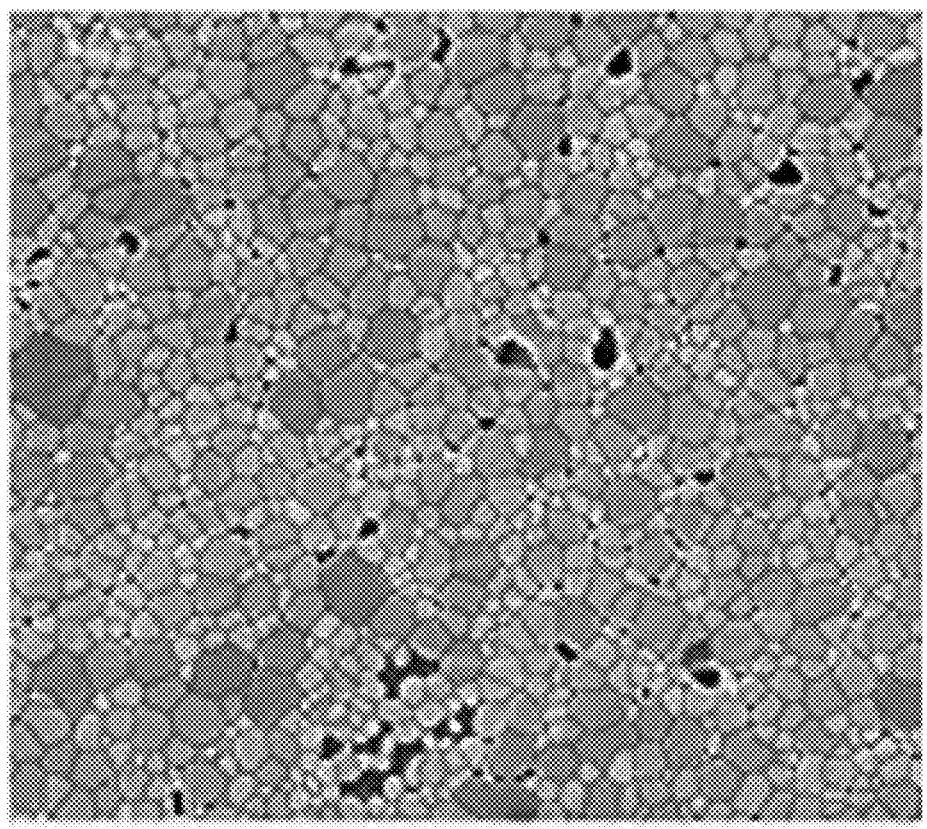
FIG. 11B is an image of a cover portion of a comparative example captured with a scanning electron microscope (SEM).

FIG. 11A is an image of a cover portion of an experimental example captured with a scanning electron microscope (SEM). FIG. 11B is an image of a cover portion of a comparative example captured with a scanning electron microscope (SEM).

Referring to FIGS. 11A and 11B, it can be seen that an average size of dielectric grains included in the cover portions of the experimental example may be larger than an average size of dielectric grains included in the cover portions of the comparative example, and the experimental example has a small number of pores per unit area, compared to the comparative example. As a result, it can be confirmed that fluorine (F) contained in the cover portions promotes grain growth of dielectric grains and improves density of the cover portions.

Figure 12A:
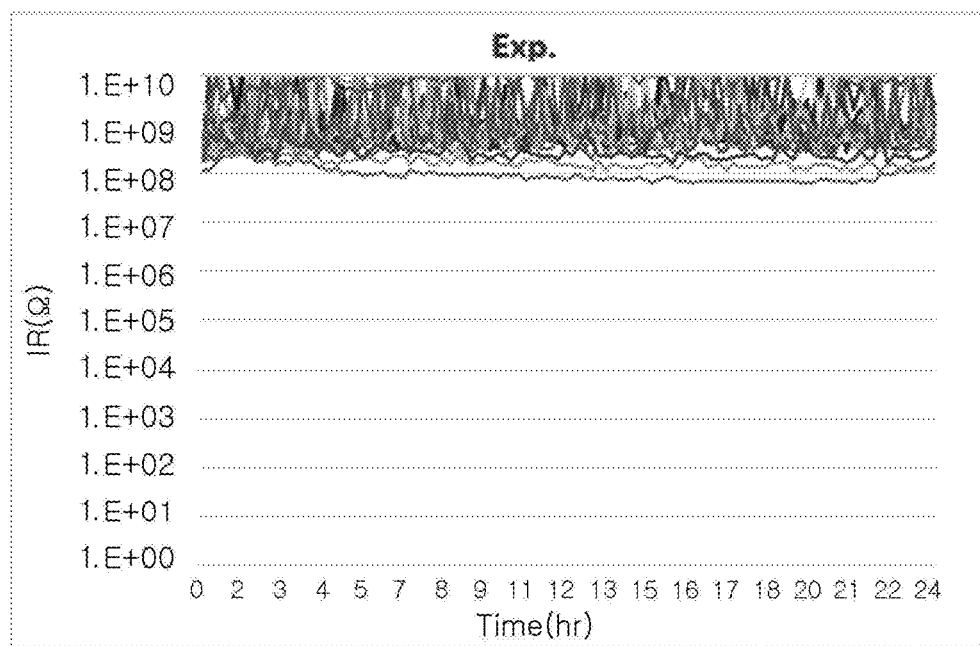
FIG. 12A is a graph illustrating results of moisture resistance reliability evaluation of an experimental example.
Figure 12B:
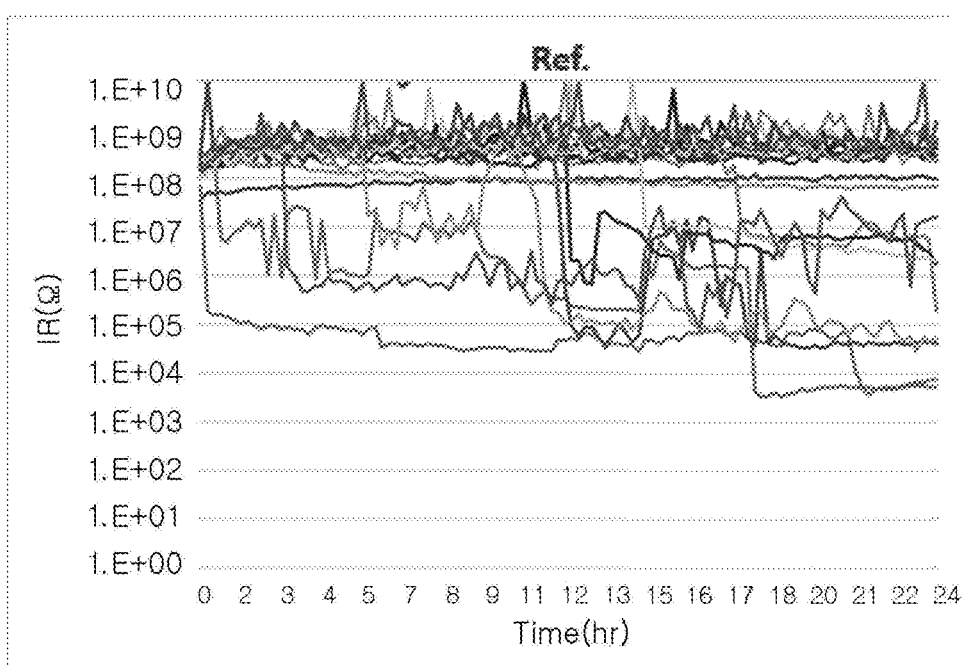
FIG. 12B is a graph illustrating results of moisture resistance reliability evaluation of a comparative example.

FIG. 12A is a graph illustrating results of moisture resistance reliability evaluation of an experimental example. FIG. 12B is a graph illustrating results of moisture resistance reliability evaluation of a comparative example. 12A and 12B illustrate a change in insulation resistance value after applying a voltage of 1.5 Vr at a temperature of 85° C. and a humidity of 85% for 12 hours to each of 400 samples of each of the experimental and comparative examples.

Referring to FIGS. 12A and 12B, in the experimental example, there was no sample having an insulation resistance of $10^7$ ω or less, but in the comparative example, there were many samples having an insulation resistance of $10^7$ ω or less. Therefore, it was confirmed that moisture resistance reliability of the multilayer electronic component was improved by including fluorine (F) in the cover portion.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of various effects of the present disclosure, density and toughness of a cover portion may increase to improve moisture resistance reliability of a multilayer electronic component.

As one of various effects of the present disclosure, folding and wrinkle defects of a cover portion pattern may be prevented to prevent a decrease in withstand voltage and a short circuit failure of a multilayer electronic component.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including:
a capacitance formation portion including a dielectric layer and an internal electrode, alternately disposed in a first direction, and
a cover portion disposed on both end surfaces of the capacitance formation portion opposing each other in the first direction; and
an external electrode disposed outside the body and connected to the internal electrode,
wherein the cover portion includes fluorine (F), and
A1 and A2 satisfy A2>A1, where A1 is an average size of a dielectric grain included in the cover portion, and A2 is an average size of a dielectric grain included in the dielectric layer.

2. The multilayer electronic component of claim 1, wherein A1 and A2 satisfy 0.55≤A1/A2≤0.585.

3. The multilayer electronic component of claim 1, wherein, in analyzing a negative ion by time-of-flight secondary ion mass spectrometry (TOF-SIMS), a fluorine ion ($F^-$) is detected in the cover portion.

4. The multilayer electronic component of claim 3, wherein, in analyzing a negative ion by time-of-flight secondary ion mass spectrometry (TOF-SIMS) of the cover portion, a ratio of a detection intensity of the fluorine ion ($F^-$) to a detection intensity of all anions is 5.78% to 12.56%.

5. The multilayer electronic component of claim 1, wherein the cover portion comprises:
BaTiO$_3$ as a main component, and
a subsidiary component including an oxide or a carbonate including at least one of Ca, Al, Li, Co, Zn, Mn, Mg, and S.

6. The multilayer electronic component of claim 1, wherein the cover portion comprises:
BaTiO$_3$ as a main component, and
at least one of Ca, Al, Li, Co, Zn, Mn, Mg, and S.

7. The multilayer electronic component of claim 1, wherein A1 is 200 nm or more and 400 nm or less.

8. The multilayer electronic component of claim 1, wherein an average thickness of the dielectric layer is 0.4 μm or less.

9. The multilayer electronic component of claim 1, wherein an average thickness of the internal electrode is 0.4 μm or less.

10. The multilayer electronic component of claim 1, wherein an average thickness of the cover portion is 15 μm or less.

11. The multilayer electronic component of claim 1, wherein the body comprises a margin portion disposed on both end surfaces of the capacitance formation portion opposing each other in a third direction,
wherein an average thickness of the margin portion is 15 μm or less.

12. The multilayer electronic component of claim 1, wherein the dielectric layer is free of fluorine (F).

13. The multilayer electronic component of claim 1, wherein the dielectric layer includes a lower amount of fluorine (F) than the cover portion.

14. A method for manufacturing a multilayer electronic component comprising a body including a capacitance formation portion including a dielectric layer and an internal electrode, alternately disposed in a first direction, and a cover portion disposed on both end surfaces of the capacitance formation portion opposing each other in the first direction, and an external electrode disposed outside the body and connected to the internal electrode, the method comprising:
a printing process including:
a process of forming a cover portion pattern by printing a first ceramic slurry including a first dielectric material and a fluorine-based compound, and
at least one of:
a process of forming a dielectric pattern by printing a second ceramic slurry including a second dielectric material, and
a process of forming an internal electrode pattern by printing a conductive paste for the internal electrode including a conductive particle for the internal electrode;
forming a stack body including the cover portion pattern, the dielectric pattern, and the internal electrode pattern;
a sintering process of sintering the stack body to obtain the body; and
a process of forming the external electrode outside the body,
wherein the first dielectric material includes BaTiO$_3$ as a main component, and an amount of a fluorine-based compound included in the first ceramic slurry is 0.2 to 1.0 parts by weight, relative to 100 parts by weight of BaTiO$_3$.

15. The method of claim 14, wherein the fluorine-based compound comprises at least one of compounds represented by Formulas 1 to 4 below:

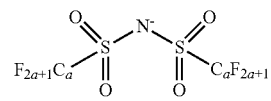
[Formula 1]

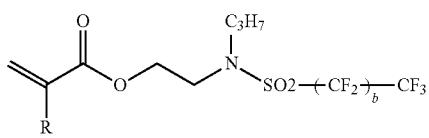
[Formula 2]

[Formula 3]

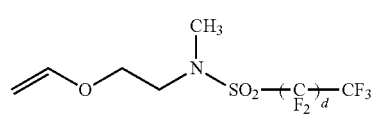
[Formula 4]

in Formulas 1 to 4,
a, b, c and d are each independently an integer of 100 to 1000.

16. The method of claim 14, wherein the first dielectric material comprises a subsidiary component including an oxide or a carbonate including at least one of Ca, Al, Li, Co, Zn, Mn, Mg, and S.

17. The method of claim 14, wherein the first dielectric material comprises at least one of Ca, Al, Li, Co, Zn, Mn, Mg, and S.

18. The method of claim 14, wherein the fluorine-based compound comprises a compound represented by Formula 1:

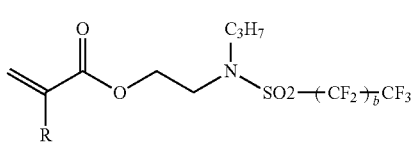
[Formula 3]

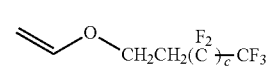
[Formula 4]

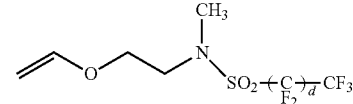

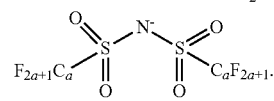

19. The method of claim 14, wherein the printing process includes the process of forming the dielectric pattern, and the second ceramic slurry is free of the fluorine-based compound.

* * * * *